(12) United States Patent
Matsumoto et al.

(10) Patent No.: US 9,993,954 B2
(45) Date of Patent: Jun. 12, 2018

(54) SURFACE PROTECTION FILM FABRICATION METHOD AND FABRICATION APPARATUS AND SURFACE PROTECTION FILM

(71) Applicants: Toray Industries, Inc., Tokyo (JP); Toray Advanced Film Co., Ltd., Tokyo (JP)

(72) Inventors: Tadashi Matsumoto, Otsu (JP); Takashi Ichinomiya, Otsu (JP); Kinzou Nakagawa, Takatsuki (JP); Nanako Furuichi, Takatsuki (JP)

(73) Assignee: TORAY ADVANCED FILM CO., LTD., Tokyo (JP)

( * ) Notice: Subject to any disclaimer, the term of this patent is extended or adjusted under 35 U.S.C. 154(b) by 638 days.

(21) Appl. No.: 14/361,234

(22) PCT Filed: Nov. 26, 2012

(86) PCT No.: PCT/JP2012/080496
§ 371 (c)(1),
(2) Date: May 28, 2014

(87) PCT Pub. No.: WO2013/080925
PCT Pub. Date: Jun. 6, 2013

(65) Prior Publication Data
US 2014/0335310 A1    Nov. 13, 2014

(30) Foreign Application Priority Data
Nov. 29, 2011 (JP) .................. 2011-259730

(51) Int. Cl.
*B29C 47/00* (2006.01)
*B29C 47/88* (2006.01)
(Continued)

(52) U.S. Cl.
CPC ........ *B29C 47/004* (2013.01); *B29C 47/0021* (2013.01); *B29C 47/0842* (2013.01);
(Continued)

(58) Field of Classification Search
CPC . B29C 47/004; B29C 47/886; B29C 47/0842; B29C 47/0021; B29C 47/0066;
(Continued)

(56) References Cited

U.S. PATENT DOCUMENTS

| 5,100,709 A | 3/1992 | Barger et al. |
| 5,827,160 A * | 10/1998 | Ohki ................ B29C 59/16 |
| | | 492/56 |

(Continued)

FOREIGN PATENT DOCUMENTS

| JP | 2804609 | 7/1998 |
| JP | 2002-240131 | 8/2002 |

(Continued)

OTHER PUBLICATIONS

International Search Report corresponding to application No. PCT/JP2012/080496, dated Feb. 5, 2013.

*Primary Examiner* — Nathan L Van Sell
(74) *Attorney, Agent, or Firm* — RatnerPrestia

(57) ABSTRACT

A method is provided for fabricating a surface protection film that has no rolling defects such as blocking or wrinkling when rolled into a roll, and that, after the film is bonded to an adherend, is rolled into a roll, and stored for long periods of time, does not transfer unevenness or fisheyes on the back surface to the adherend. The surface protection film is fabricated as an elastomer by setting the arithmetical mean roughness (Ra) of the surface of a cold roller (4) to no more than 0.2 µm, and the ten point mean roughness (Rz) of the (Continued)

surface of a nip roller (3) to 2-8 μm and the mean distance (Sm) between protrusions and depressions thereof to no more than 90 μm.

5 Claims, 2 Drawing Sheets

(51) Int. Cl.
| | | |
|---|---|---|
| *B29C 47/14* | (2006.01) | |
| *B29C 47/08* | (2006.01) | |
| *B32B 27/30* | (2006.01) | |
| *B32B 27/08* | (2006.01) | |
| *B32B 3/00* | (2006.01) | |
| *B32B 27/32* | (2006.01) | |
| *C08J 5/18* | (2006.01) | |
| *G02B 5/30* | (2006.01) | |
| *B29K 23/00* | (2006.01) | |
| *B29K 33/00* | (2006.01) | |
| *B29K 505/02* | (2006.01) | |
| *B29L 7/00* | (2006.01) | |

(52) U.S. Cl.
CPC .............. *B29C 47/886* (2013.01); *B32B 3/00* (2013.01); *B32B 27/08* (2013.01); *B32B 27/308* (2013.01); *B32B 27/32* (2013.01); *C08J 5/18* (2013.01); *G02B 5/3083* (2013.01); *B29C 47/003* (2013.01); *B29C 47/0066* (2013.01); *B29C 47/0898* (2013.01); *B29C 47/14* (2013.01); *B29C 47/8845* (2013.01); *B29K 2023/0625* (2013.01); *B29K 2023/0633* (2013.01); *B29K 2033/12* (2013.01); *B29K 2505/02* (2013.01); *B29K 2883/005* (2013.01); *B29L 2007/001* (2013.01); *B32B 2250/24* (2013.01); *B32B 2307/538* (2013.01); *B32B 2307/584* (2013.01); *B32B 2307/72* (2013.01); *B32B 2307/746* (2013.01); *B32B 2307/748* (2013.01); *B32B 2457/202* (2013.01); *C08J 2323/04* (2013.01); *Y10T 428/24355* (2015.01)

(58) Field of Classification Search
CPC . B29C 47/14; B29C 47/8845; B29C 47/0898; B29C 47/003; B32B 27/08; B32B 27/308; B32B 3/00; B32B 27/32; B32B 2307/538; B32B 2457/202; B32B 2307/72; B32B 2307/748; B32B 2250/24; B32B 2307/746; B32B 2307/584; C08J 5/18; C08J 2323/04; G02B 5/3083; Y10T 428/24355; B29K 2883/005; B29K 2023/0633; B29K 2505/02; B29K 2023/0625; B29K 2033/12; B29L 2007/001
See application file for complete search history.

(56) References Cited

U.S. PATENT DOCUMENTS

| | | | | |
|---|---|---|---|---|
| 2009/0135344 | A1* | 5/2009 | Suzuki | .................... B29C 41/28 349/96 |
| 2011/0300430 | A1* | 12/2011 | Usami | ................. H01M 2/1653 429/144 |
| 2013/0052418 | A1 | 2/2013 | Asada et al. | |

FOREIGN PATENT DOCUMENTS

| | | | | |
|---|---|---|---|---|
| JP | 2004-268328 | | 9/2004 | |
| JP | 2004-330651 | | 11/2004 | |
| JP | 2005-28618 | | 2/2005 | |
| JP | 2009-248364 | | 10/2009 | |
| JP | 2010-76287 | | 4/2010 | |
| JP | WO 2010074151 A1 * | 7/2010 | .......... H01M 2/1653 |
| JP | 2011-53535 | | 3/2011 | |
| JP | 2011-93258 | | 5/2011 | |
| JP | 2011-112945 | | 6/2011 | |
| JP | 2012-11735 | | 1/2012 | |
| JP | 2012-236381 | | 12/2012 | |
| JP | 2012-245708 | | 12/2012 | |
| WO | WO 2011/129167 | | 10/2011 | |

* cited by examiner

SURFACE PROTECTION FILM FABRICATION METHOD AND FABRICATION APPARATUS AND SURFACE PROTECTION FILM

CROSS REFERENCE TO RELATED APPLICATIONS

This is the U.S. National Phase Application of PCT International Application No. PCT/JP2012/080496, filed Nov. 26, 2012, which claims priority to Japanese Patent Application No. 2011-259730, filed Nov. 29, 2011, the disclosures of each of these applications being incorporated herein by reference in their entireties for all purposes.

FIELD OF THE INVENTION

This invention relates to a method for producing a surface protection film for protecting the surface of a plastic film, and in particular, an optical film such as phase difference film, a fabrication apparatus, and a surface protection film.

BACKGROUND OF THE INVENTION

A surface protection film is a pressure-sensitive adhesive plastic film for protecting a product such as plastic film, resin plate, metal foil, metal plate, or the like (hereinafter referred to the adherend) from scratches and contamination in the production process or transportation which is used by adhesion onto the surface of the adherend.

The surface protection film is required to retain the minimum necessary pressure-sensitive adhesion function under the conditions of use while it is also required to be easily peelable once the surface protection function is no longer needed. Simultaneously, the surface protection film should not leave any mark of its use such as smudge and scratch on the adherend. In particular, when the surface protection film is used for an optical film such as a phase difference film used in liquid crystal display, there is a strict requirement that the so-called fish eye which is the foreign matter in the surface protection film or the protrusion formed by the oxidized resin should not be transferred to the adherend as dents. The requirement is increasingly strict in these years, and such transfer defects should not be generated by the increased internal pressure due to the tension of the film itself even when the surface protection film is adhered to the adherend, wound in the roll form, and stored for a long term.

With regard to the reduction of the fish eyes, Patent Document 1 discloses a method wherein a molten resin ejected from the T die is pressed between a metal roller having a smooth surface (with the maximum height Ry of up to 0.5 μm) and a touch roller having an elastic smooth surface (with the maximum height Ry of up to 0.5 μm) to crush the fish eye, although this document is not related to a surface protection film.

However, due to the pressure-sensitive adhesive nature of the surface protection film, the surface protection film wound in roll form often suffered from the problem of blocking, namely, adhesion of the surface having the pressure-sensitive adhesive force (hereinafter referred to as the "adhesive surface") to the other surface of the film (hereinafter referred to as the "rear surface"). Accordingly, even if all fish eyes could be crushed by the use of such technology of the Patent Document 1, use of such technology alone still resulted in the smooth opposite surfaces of the surface protection film and even severer blocking problem, and the wound film could not be rewound and use of such surface protection film was practically unacceptable.

As a countermeasure for such blocking problem, there has been proposed a method wherein the surface of the nip roller is formed from a rubber so that the rear surface would a surface like a ground glass or an embossed surface (for example, Patent Documents 2 and 3).

In this method, the surface morphology of the rubber covering the nip roller is transferred to the rear surface of the film, and the rear surface of the film will be provided with the surface irregularities like that of the ground glass. The thus introduced cushioning effect results air entrapment between the layers, and releasability is thereby provided. This releasability prevents the blocking. Furthermore, the resulting slipperiness contributes for the good roll shape.

However, it is the finding of the inventors of the present invention that, this technique has the problem that, when the adherend is a very soft film as in the case of the phase difference film, the surface irregularity morphology of the rear surface is transferred to the adherend during the long term storage after adhering with the adherend and winding in the form of a roll, and in such a case, the adherend having the resulting dents is no longer usable.

Patent Document 4 also suffers from the problem that, since transfer of the surface irregularity morphology to the adherend is not at all considered despite limitation of the arithmetic mean roughness Ra of the nip roller surface and the surface of the film having the surface irregularity to the range of 0.8 to 10 μm as a countermeasure to the blocking, the surface irregularity morphology of the rear surface is highly likely to be transferred to the adherend surface in the form of dents as described above when the Ra is 1 μm or higher, and depending on the surface irregularity morphology, the transfer of the surface irregularity morphology even still occurs even if Ra were less than 1 μm. This is the result of the fact that the arithmetic mean roughness Ra is a parameter which is less likely to reflect the morphology of the less frequent and relatively large surface irregularities and the density of the surface irregularities. More specifically, the inventors of the present invention have found that the transfer of the surface irregularity morphology to the adherend is affected by the size and density of the surface irregularities, and prevention of the transfer of the surface irregularity morphology to the adherend is difficult by solely considering the arithmetic mean roughness Ra.

The inventors of the present invention also proposes a method wherein a compactly embossed surface is formed on the surface of a multi-layer surface protection film by forming the layer constituting the rear surface (hereinafter referred to as the rear surface layer) from a polypropylene resin and a polyethylene resin without the step of pressing the film between the cooling roller and the nip roller (Patent Document 5). In this method, however, the use of the polypropylene resin resulted in the excessive hardness of the rear surface, and accordingly, when such surface protection film is adhered to a very soft adherend such as a phase difference film and stored for a long time after winding in roll form, complete prevention of the transfer of the surface irregularity morphology of the rear surface to the adherend surface was sometimes impossible.

PATENT DOCUMENTS

Patent document 1: Japanese Patent Application Laid-open No. 2004-330651
Patent document 2: Japanese Patent Application Laid-open No. 2005-28618

Patent document 3: Japanese Patent No. 2804609
Patent document 4: Japanese Patent Application Laid-open No. 2004-268328
Patent document 5: Japanese Patent Application Laid-open No. 2012-11735

SUMMARY OF THE INVENTION

This invention provides a method for fabricating a surface protection film which does not experience the blocking in the winding of the film in the form of a roll and which does not experience the transfer of the surface irregularities of the rear surface to the adherend even in the long term storage after adhering the film to the adherend and winding in a roll form. This invention also provides a fabrication apparatus capable of producing such surface protection film as well as such surface protection film.

The present invention provides a method for fabricating a surface protection film comprising the steps of ejecting a molten resin from a T die, pressing and cooling the extrudate between a cooling roller and a nip roller to obtain a plastic film, wherein the cooling roller used has an arithmetic mean roughness Ra of up to 0.2 µm, and the nip roller used has an elastomer surface with a ten point mean roughness Rz of 2 to 8 µm and a mean spacing between the surface irregularities Sm of up to 90 µm.

According to this preferable embodiment of the present invention, the present invention provides the method for fabricating a surface protection film as described above wherein the elastomer contains solid particles, and volume of the solid particles having the particle diameter in excess of 19 µm is less than 1% of the entire volume of the solid particles.

According to this preferable embodiment of the present invention, the present invention provides the method for fabricating a surface protection film as described above wherein aluminum oxide is added as the solid particles in the elastomer.

According to this preferable embodiment of the present invention, the present invention provides the method for fabricating a surface protection film as described above wherein the elastomer has been finally grinded with a rotating grinding wheel.

According to this preferable embodiment of the present invention, the present invention provides the method for fabricating a surface protection film as described above wherein the elastomer is an RTV silicone rubber.

According to another embodiment of the present invention, the present invention provides an apparatus for fabricating a surface protection film as described above wherein the apparatus has a T die, a cooling roller, and a nip roller, and the cooling roller has an arithmetic mean roughness Ra of up to 0.2 µm, and the surface of the nip roller comprises an elastomer having a ten point mean roughness Rz of 2 to 8 µm, and a mean spacing between the surface irregularities Sm of up to 90 µm.

According to this preferable embodiment of the present invention, the present invention provides the apparatus for fabricating a surface protection film as described above wherein the elastomer contains solid particles, and volume of the solid particles having the particle diameter in excess of 19 µm is up to 1% of the entire volume of the solid particles.

According to this preferable embodiment of the present invention, the present invention provides the apparatus for fabricating a surface protection film as described above wherein aluminum oxide is added as the solid particles in the elastomer.

According to this preferable embodiment of the present invention, the present invention provides the apparatus for fabricating a surface protection film as described above wherein the elastomer has been finally grinded with a rotating grinding wheel.

According to this preferable embodiment of the present invention, the present invention provides the apparatus for fabricating a surface protection film as described above wherein the elastomer is an RTV silicone rubber.

According to another embodiment of the present invention, the present invention provides a nip roller for film formation wherein the surface of the nip roller comprises an elastomer, and the surface of the nip roller has a ten point mean roughness Rz of 2 to 8 µm and a mean spacing between the surface irregularities Sm of up to 90 µm.

According to this preferable embodiment of the present invention, the present invention provides the nip roller for fabricating a surface protection film as described above wherein the elastomer contains solid particles, and volume of the solid particles having the particle diameter in excess of 19 µm is less than 1% of the entire volume of the solid particles.

According to this preferable embodiment of the present invention, the present invention provides the nip roller for fabricating a surface protection film as described above wherein aluminum oxide is added as the solid particles in the elastomer.

According to this preferable embodiment of the present invention, the present invention provides the nip roller for fabricating a surface protection film as described above wherein the elastomer has been finally grinded with a rotating grinding wheel.

According to this preferable embodiment of the present invention, the present invention provides the nip roller for fabricating a surface protection film as described above wherein the elastomer is an RTV silicone rubber.

According to still further preferable embodiment of the present invention, the present invention provides a surface protection film comprising one layer or two or more layers wherein one surface has an arithmetic mean roughness Ra of up to 0.4 µm; the other surface has a ten point mean roughness Rz of 3 to 10 µm and a mean spacing between the surface irregularities Sm of up to 90 µm; and the layer forming the surface having the ten point mean roughness Rz of 3 to 10 µm and the mean spacing between the surface irregularities Sm of up to 90 µm comprises a low density polyethylene (LDPE), a linear low density polyethylene (LLDPE), or an ethylene-methyl methacrylate copolymer (EMMA).

According to this preferable embodiment of the present invention, this invention provides the surface protection film as described above wherein the number of protrusions on the other surface of the surface protection film having a size of at least 0.05 mm$^2$ and a height of at least 5 µm is 0 per m$^2$.

According to this preferable embodiment of the present invention, this invention provides the surface protection film as described above wherein all layers comprise a low density polyethylene (LDPE) or a linear low density polyethylene (LLDPE).

According to this preferable embodiment of the present invention, this invention provides the surface protection film as described above wherein all layers comprise a linear low density polyethylene, and the arithmetic mean roughness Ra of the one surface is up to 0.2 µm.

According to this preferable embodiment of the present invention, this invention provides the surface protection film as described above wherein compressive modulus in the film thickness direction is 20 to 70 MPa.

The arithmetic mean roughness Ra, the ten point mean roughness Rz, and the mean spacing between the surface irregularities Sm are those defined in JIS B0601-1994.

The elastomer is a solid material which is a polymeric organic compound or a material containing the polymeric organic compound as its basic component, and which is the one defined in JIS K6200. Exemplary such elastomers include silicone rubber, butadiene-acrylonitrile copolymer (NBR), polychloroprene (CR), chlorosulfonated polyethylene (CSM), ethylene-propylene copolymer, ethylene propylene diene rubber (EPDM), any of these elastomers having an additive for improving weatherability, slipperiness, abrasion resistance, and the like added thereto, and any of these elastomers with modified formulation.

The solid particles are those comprising an organic or inorganic material, and the solid particle alone does not have rubber elasticity. The solid particles incorporated in the elastomer as the filler may comprise, for example, silicon oxide, aluminum oxide, or a mixture thereof.

In the present invention, "being finally grinded with a rotating grinding wheel" means that the process of removing using a grinding paper, grinding fabric, fixed grinding wheel, knife, or the like is not substantially conducted between this polishing step and the use. However, the removal of the smudge and coarse protrusion by the non-woven or woven fabric or the like is not included in such process of removal since such removal does not involve substantial change in the properties realized by the surface morphology of the nip roller.

The RTV (room temperature vulcanization) is a silicone rubber which is the type converted from liquid to elastomer by crosslinking under the room temperature condition. On the contrary, the type of the silicone rubber which requires heating for the crosslinking is called HTV (high temperature vulcanization) silicone rubber. Exemplary silicone rubbers include methylsilicone rubber, vinylmethylsilicone rubber, phenylmethylsilicone rubber, and fluorosilicone rubber.

The one surface of the surface protection film having the arithmetic mean roughness Ra of up to 0.4 µm is formed by the transfer of the surface morphology of the cooling roller having the arithmetic mean roughness Ra of 0.2 µm, and the other surface of the surface protection film having the ten point mean roughness Rz of 3 to 10 µm and the mean spacing between the surface irregularities Sm of up to 90 µm is formed by the transfer of the surface morphology of the nip roller having the ten point mean roughness Rz of 2 to 8 µm and the mean spacing between the surface irregularities Sm of up to 90 µm.

The low density polyethylene and the linear low density polyethylene in the present invention are the same as those typically considered by skilled in the art from these terms, and the preferred are those produced by the method known in the art.

The compressive modulus in the film thickness direction is the value obtained by measuring the compressive modulus in the film thickness direction under the pressure of 0.6 MPa to 12 MPa. Typically, the value measured is not a constant value in the pressure range as described in FIG. 2, and the range between the maximum value and the minimum value is regarded as the range of the modulus. Accordingly, the compressive modulus of 20 to 70 MPa means that the maximum value and the minimum value are both in the range of 20 to 70 MPa.

The present invention is capable of providing a method for fabricating a surface protection film which does not experience the blocking in the winding of the film in the form of a roll and which does not experience transfer of the surface irregularities of the rear surface to the adherend even in the long term storage after adhering the film to the adherend and winding in a roll form. The present invention also provides a fabrication apparatus capable of producing such surface protection film as well as such surface protection film.

DETAILED DESCRIPTION OF EMBODIMENTS OF THE INVENTION

Figure 1:
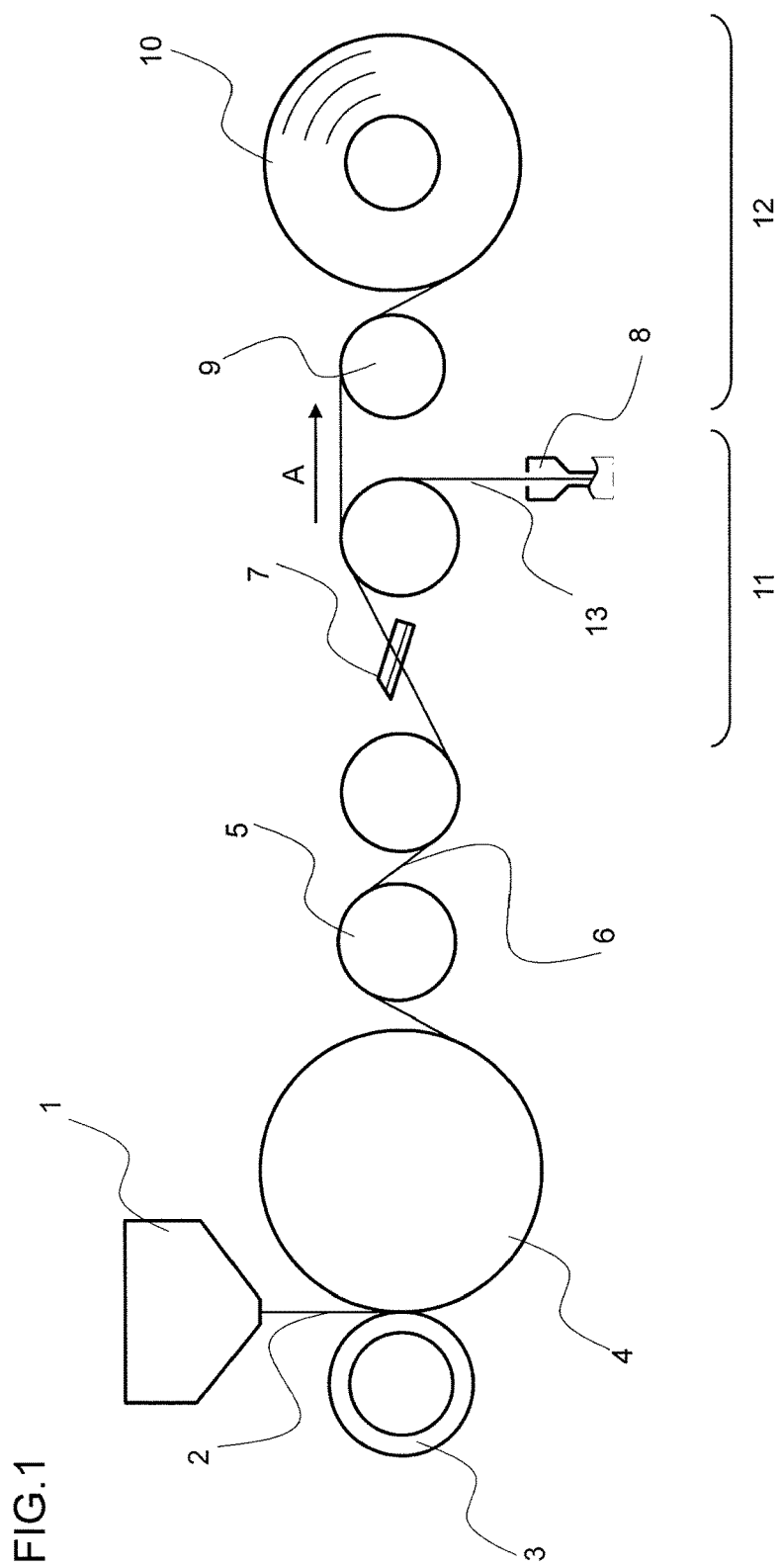
FIG. 1 is a schematic side view of an apparatus for fabricating a surface protection film of an embodiment of the present invention.

Next, embodiments of the present invention are described by referring to the drawings.

FIG. 1 is a schematic side view of an apparatus for fabricating a surface protection film of an embodiment of the present invention. In the apparatus for fabricating a surface protection film, a molten resin 2 ejected from a T die 1 is pressed and cooled between a cooling roller 4 and a nip roller 3 to obtain a surface protection film 6.

Next, if desired, the film is cut or the edge 13 is trimmed in a slit step 11, and the film is wound up in the form of a roll in a winding step 12 to produce a film roll 10. After another optional slit step and other processing steps, product roll of the film is obtained.

From the slit of T die 1 extending in the direction perpendicular to the drawing, the molten resin 2 that has been melted, kneaded in the extruder (not shown) and supplied to is extruded in sheet form. Provision of a filtration apparatus called a polymer filter between the extruder and the T die 1 is preferable in view of reducing inclusion of the fish eye. Preferably, width of the slit of the T die 1 is adjustable to control thickness inconsistency of the film 6 in the width direction. Thickness of the film formed can be adjusted by the ratio of the ejection speed of the resin to the rotation speed of the cooling roller. When the surface protection film formed has a multi-layer structure, co-extrusion may be conducted by providing a feed block in the upstream of the T die 1, or using a T die 1 having a multi-manifold structure to thereby form a multi-layer film.

The T die 1, the cooling roller 4, and the nip roller 3 are preferably located in mutual position so that the fish eyes area efficiently crushed and the surface morphology of the nip roller 3 to the molten resin are accurately transferred, and accordingly, the molten resin 2 is preferably sandwiched in molten state before cooling. More specifically, the position of the T die 1 or the cooling roller 4 are preferably adjusted so that the molten resin 2 is directly intruded into the nip point as shown in FIG. 1. The position may be adequately adjusted as desired by confirming the surface condition of the adhered surface and the rear surface.

The cooling roller 4 used is the one having a structure which has, for example, a flow path where a cooling medium can be introduced in its interior to regulate the surface temperature. While the surface temperature of the cooling roller 4 is adequately selected depending on the type of the molten resin 2, the time the molten resin 2 is brought in contact with the cooling roller 4, as well as temperature and humidity of the room, the surface temperature is preferably 10 to 60° C., and more preferably 15 to 40° C. in view of the film formation speed and the surface quality of the surface protection film. When the surface temperature of the cooling roller 4 is within such range, the molten resin 2 can be easily cooled and solidified at the film formation speed in practical range, and degradation of the surface quality of the surface protection film 6 by dew condensation on the surface of the cooling roller 4 in the film formation can be easily prevented.

The material used for the surface of the cooling roller 4 is not particularly limited, and the surface may comprise a metal, ceramics, resin, a composite film of a metal and a resin, or a carbon-based film such as diamond-like carbon. While an elastomer may be used for the surface of the cooling roller 4, use of the elastomer may result in the poor cooling efficiency due to the thermal insulation and the change in the surface morphology by abrasion, when the elastomer used has low rubber hardness. Accordingly, the elastomer used is preferably the one having a surface layer thickness of 1 to 5 mm and a rubber hardness of at least 80 Hs JIS A, and use of a metal or ceramic material having a higher thermal conductivity and hardness is more preferable. Exemplary preferable metals include iron, steel, stainless steel, and chromium, nickel, and preferable exemplary ceramics include sintered alumina, silicon carbide, and silicon nitride. The surface morphology of the cooling roller 4 will be transferred to the molten resin, and this morphology corresponds to the morphology of the adhesive surface of the surface protection film, and therefore, the surface of the cooling roller 4 is preferably formed from a chromium plating for engineering purpose having good durability and rust prevention property or ceramics in view of preventing loss of aesthetic quality or formation of protrusion defects of the surface protection film 6. When a metal is used for the surface of the cooling roller 4, mechanical processing using a metal material or a surface treatment technology known in the art such as electroplating or electroless plating can be adequately used. Similarly, in order to obtain a ceramic surface, mechanical processing using a ceramic material or a surface treatment technology known in the art such as thermal spraying and coating may be adequately used.

As described above, the surface morphology of the cooling roller 4 is transferred to the molten resin 2 to determine the morphology of the adhesive surface of the surface protection film 6. The pressure-sensitive adhesion force of the surface protection film 6 reduces with the increase in the size of the arithmetic mean roughness Ra of the adhesion surface, and the surface protection film 6 finally becomes non-adhesive. While the pressure-sensitive adhesion force can be increased by adding an additive such as a tackifier to the resin, such addition may invite remaining of the additive on the adherend when the surface protection film 6 is peeled off the adherend or difficulty of the resin reuse due to the presence of the additive, and therefore, it is important that a pressure-sensitive adhesion force sufficient for the surface protection film is obtained by the use of the resin alone both in view of the quality and the cost. Accordingly, the arithmetic mean roughness Ra of the cooling roller 4 selected is up to 0.2 μm, and more preferably up to 0.1 μm. When the arithmetic mean roughness Ra of the cooling roller 4 is up to 0.2 μm, a sufficient pressure-sensitive adhesion force to the adherend can be realized even when the polyethylene resin such as low density polyethylene or linear low density polyethylene is used alone. It to be noted that production of the surface having the arithmetic mean roughness Ra of less than 0.001 μm is extremely difficult and costly, and therefore, the arithmetic mean roughness Ra is preferably at least 0.001 μm while the merits of the present invention is not lost even if the arithmetic mean roughness Ra is less than 0.001 μm.

The arithmetic mean roughness Ra of the cooling roller 4 can be reduced to the range of up to 0.2 μm, for example, by the common mirror surface polishing such as buff polishing.

The nip roller 3 has a structure comprising a cylindrical structure member of a metal, a plastic, or a fiber reinforced resin covered with an elastomer, which is preferably a structure capable of controlling its surface temperature as in the case of the cooling roller 4. By covering the surface of the nip roller 3 with an elastomer, nip inconsistency caused by insufficient precision and deflection of the cooling roller 4 and the nip roller 3 as well as inconsistent thickness of the ejected molten resin 2 can be prevented, and even in the production of a surface protection film 6 as thin as 100 μm or less, the film having the surface morphology consistent throughout its width can be produced. Exemplary methods used for the covering of the elastomer include winding an unvulcanized rubber sheet followed by vulcanization, coating or filling an unvulcanized rubber liquid in a mold followed by vulcanization, and insertion of a mandrel in a vulcanized rubber tube followed by adhesion, as in the case of producing the rubber roller.

Thermal conductivity of plastics and fiber-reinforced fibers are generally lower than metals and the cooling from the interior is not conducted to the surface, and therefore, efficient reduction in the surface temperature is not possible. Accordingly, the material used for the cylindrical structural material is preferably a metal such as iron, steel, or stainless steel.

Exemplary elastomers include silicone rubber, butadiene-acrylonitrile copolymer (NBR), polychloroprene (CR), chlorosulfonated polyethylene (CSM), ethylene-propylene copolymer, ethylene propylene diene rubber (EPDM), any of these elastomers having an additive for improving weatherability, slipperiness, abrasion resistance, and the like added thereto, and any of these elastomers with modified formulation. In the present invention, the most preferred is an RTV silicone rubber.

RTV silicone rubbers exhibit particularly excellent releasability from a molten polyolefin resin compared to HTV silicone rubbers and other rubbers, and they can prevent adhesion of the molten resin 2 to the surface of rubber surface in the conditions when the surface of the nip roller 3 is at a high temperature. When the adhesion of the molten resin 2 to the surface of the nip roller is less likely to occur, limitation of the film formation speed set by the winding of the molten resin 2 to the nip roller 3 which is the cause of the adhesion is markedly improved, and this results not only in the improved productivity, but also in the merit that use of the back-up roller for reducing the surface temperature of the nip roller 3 is no longer needed. This in turn means that the surface of the nip roller 3 is not abraded by the back-up roller, and the surface morphology of the nip roller 3 can be maintained in the desired state for a long term. This enables stable production of the surface protection film 6 having a surface roughness which does not result in the blocking or roll shape defects such as creases in the winding of the surface protection film 6 in roll form and which will not invite transfer of the surface irregularity morphology of the rear surface of the surface protection film 6 to the adherend.

An elastomer usually has solid particles comprising an organic and/or inorganic composition called a filler added thereto mainly for the purpose of reinforcing the elastomer or reducing the cost of the elastomer. Exemplary fillers used include silicon oxide, aluminum oxide, carbon black, and mixtures of such compound. The particle diameter of the filler may vary depending on the intended application and the cost, and for general-purpose rollers, the filler used has an average particle diameter of approximately 10 μm to 30 μm with the maximum particle diameter of approximately 30 μm to 70 μm. Use of an elastomer having the filler added is also preferable in the present invention, and in the application such as phase difference film for mobile terminals wherein dent defects are extremely severely checked, use of an elastomer having blended therewith a filler wherein the volume of the solid particles having the particle diameter in excess of 19 μm is less than 1% of the entire volume of the solid particles is particularly preferred. While the particle size distribution such as average particle diameter is not particularly limited as long as a filler wherein the volume of the solid particles having the particle diameter in excess of 19 μm is less than 1% of the entire volume of the solid particles, the average particle diameter is typically in the range of 5 μm to 17 μm when the filler comprises a metal oxide such as aluminum oxide.

The filler blended in the elastomer falls off the elastomer in the surface polishing and also in use, and this results in the dents on the nip roller surface. In particular, when a plurality of particles are collectively present or when the particle falls off with the surrounding elastomer, the dent formed will be larger than the particle. When the molten resin 2 is pressed between the cooling roller 4 and the nip roller 3, the molten resin 2 enters in this dent, and the protrusion is formed on the rear surface of the surface protection film 6. When the particles having a particle diameter in excess of 19 μm is in excess of 1% of the solid particles of the filler, the probability of the formation of the protrusions having a size of at least 0.05 mm$^2$ and a height of 5 μm on the rear surface of the surface protection film 6 will be increased. When the protrusions having a size of at least 0.05 mm$^2$ and a height of 5 μm are formed on the rear surface of the surface protection film 6, and the surface protection film 6 is adhered to the adherend and the wound roll is stored for a long term, the dent formed by the transfer of the protrusion may be regarded a defect in the extremely severe applications where such dents are regarded as defects. A surface protection film wherein the number of the protrusions having a size of at least 0.05 mm$^2$ and a height of 5 μm on the rear surface is 0 can be obtained by using an elastomer wherein the volume of the solid particles having the particle diameter in excess of 19 μm is less than 1% of the entire volume of the solid particles in the filler.

The filler is generally blended in the stage of producing the elastomer material, and since the elastomer material is almost always produced by mass-production, it is difficult to for an individual user to change the particle diameter of the filler as desired. Accordingly, the preferable method used in the present invention is blending of aluminum oxide particles in an elastomer material having no filler blended therein or an elastomer material having a filler having an extremely small particle diameter blended therewith to thereby determine the maximum particle diameter of the filler as desired. Aluminum oxide particle is a commercially available inexpensive grinding material which can be used for blending in the elastomer, and the preferable particles are precision grinding fine powders at #2000 to #4000 defined in JIS R 6001-1998. When the particle diameter is larger than that of the precision grinding fine powder #2000, the particles having a particle diameter in excess of 19 μm will exceed 1%, while the particle diameter smaller than #4000 is likely to result in the smooth surface of the nip roller 3 after the polishing, and it will be difficult to realize the ten point mean roughness Rz larger than 2 μm. Accordingly, the range as described above is preferable. The particle diameter of the solid particles can be measured by using a laser diffraction scattering particle size distribution analyzer (for example, LMS-30 manufactured by Seishin Enterprise Co., Ltd.).

The elastomer is not particularly limited for its hardness. The hardness, however, is preferably 40 to 95 Hs JIS A (JIS K 6301-1995) and more preferably, 65 to 90 Hs JIS A in view of followability to the resin thickness inconsistency and durability. More specifically, in the case of a soft rubber having an elastomer hardness of less than 40 Hs JIS A, the surface is easily abraded and maintenance of the constant surface morphology is difficult. In the case of forming the surface protection film 6 having a thickness of up to 100 μm, the rubber can not follow the inconsistency in the thickness of the molten resin 2 ejected from the T die 1 when the hardness is in excess of 95 Hs JIS A, and the resulting nip inconsistency invites transfer inconsistency from the surface morphology of the roller to the molten resin 2, and hence, poor quality. The rubber hardness is preferably 65 Hs JIS A or higher in order to realize the effect of crushing the fish eyes in the molten resin in the pressing of the molten resin 2 between the cooling roller 4 and the nip roller 3.

The elastomer may preferably have a thickness in the range of 1 to 15 mm, and more preferably 3 to 5 mm. The thickness of the elastomer within such range will facilitate simultaneous realization of, the effect of cooling the surface of the nip roller 3 and the prevention of the nip inconsistency by the rubber elasticity.

The surface of the nip roller 3 has a ten point mean roughness Rz of 2 to 8 μm, and also, a mean spacing between the surface irregularities Sm of up to 90 μm, and the Sm is preferably up to 70 μm. Since the surface roughness of the nip roller 3 is transferred to the molten resin 2, and the surface irregularities of the rear surface of the surface protection film 6 is thereby formed, the ten point mean roughness Rz of the nip roller 3 in excess of 8 μm results in the ten point mean roughness Rz of the rear surface of the surface protection film 6 in excess of 10 μm, and this invites transfer of the surface irregularities of the rear surface to the surface of the adherend when the surface protection film 6 is adhered to a soft adherend such as phase difference film and the wound up film in roll form is stored for a long term. In addition, when the ten point mean roughness Rz of the nip roller 3 is less than 2 μm, the ten point mean roughness Rz of the rear surface of the surface protection film 6 will be less than 3 μm, and releasability from the adhered surface will be reduced, and risk of the blocking in the winding of the surface protection film 3 will be increased. Coefficient of friction will also be increased with the decrease in the slipperiness, and this may promote roll shape defects such as crease formation. Furthermore, the cushioning property owing to the surface irregularity morphology on the rear surface of the surface protection film 6 will be significantly reduced, and the fish eyes are easily transferred to the adherend. Even if the ten point mean roughness Rz were in the range as described above, the risk of the transfer of the surface irregularity morphology to the adherend as well as the blocking and formation of defects such as creases in the winding as described above will be increased when the mean spacing between the surface irregularities Sm on the surface of the nip roller 3 is 90 µm or more. Conceivably, when the mean spacing between the surface irregularities Sm of the surface of the nip roller 3 is in excess of 90 µm, the mean spacing between the surface irregularities Sm of the rear surface of the surface protection film 6 will also be at least 90 µm and the number of protrusions in the surface irregularity will be reduced, and this in turn results in the decrease of the true contact area between the adherend and the rear surface of the surface protection film 6, and the increased local pressure invites transfer of the surface irregularity morphology to the adherend. In addition, in the surface wherein the mean spacing between the surface irregularities Sm is in excess of 100 µm, substantially all area of the rear surface of the surface protection film 6 will be smooth with the loss of the cushioning property provided by the surface irregularity, and this facilitates transfer of the fish eyes and loss of releasability inviting blocking and other phenomenon. While smaller mean spacing between the surface irregularities Sm of the surface of the nip roller 3 is favorable for the prevention of the transfer of the surface irregularity morphology to the adherend and the blockage and crease formation in the winding as described above, the mean spacing between the surface irregularities Sm is preferably at least 10 µm in view of the difficulty of the processing of the roller surface and difficulty of the transfer to the rear surface of the surface protection film 6.

Use of the ten point mean roughness Rz as the parameter for the surface morphology of the nip roller 3 and the rear surface of the surface protection film 6 enables control of absolute height and depth of the surface irregularities contributing for the transfer of the surface irregularity morphology, and use of the mean spacing between the surface irregularities Sm enables control of the density of the surface irregularity. There is substantially no relation between the arithmetic mean roughness Ra and the value of the ten point mean roughness Rz of the nip roller 3 and the rear surface of the surface protection film 6, and according to the findings of the inventors of the present invention, the value of the Rz is widely distributed between 3 to 20 times the value of the Ra.

The ten point mean roughness Rz and the mean spacing between the surface irregularities Sm of the nip roller 3 are determined by the particle diameter of the filler blended in the elastomer and the method used for polishing the surface. The ten point mean roughness Rz and the mean spacing between the surface irregularities Sm of the nip roller 3 may be adjusted to the range as described above, for example, by using an elastomer wherein the maximum particle diameter of the filler is up to 90 µm, and using a sand paper having a grit size of P600 (JIS R 6010-2000) for the final polishing. However, the most preferred is use of the elastomer wherein the maximum particle diameter is up to 19 µm as described above. The final polishing is preferably conducted by using a rotating grinding wheel. While the polishing in the polishing step is normally conducted by rotating the roller, polishing streaks in the rotational direction of the roller is likely to remain when the polishing is conducted by using a fixed grinder material as in the case of manual finishing using a sand paper. When polishing streaks are left on the surface of the nip roller 3 and protrusions corresponding to the shape of the streaks are formed on the rear surface of the surface protection film 6, this morphology may be transferred to the adherend especially in the case of a soft adherend. In contrast, the grinder material constantly moves in the polishing with a rotating grinding wheel, and the streaks are not left after the polishing. Although the polishing using a grinding wheel normally results in a surface roughness higher than the polishing using a sand paper and realization of the surface roughness as described above is difficult, the surface roughness as described above can be easily realized by using an elastomer wherein the solid particles having the particle diameter in excess of 19 µm is less than 1% of the solid particles of the filler and polishing the elastomer by rotating a grinding wheel having a grit size #800 (JIS R 6001-1998).

The nip roller 3 is pressed against the cooling roller 4 by a method wherein the gap between the cooling roller 4 and the nip roller 3 or the amount of the displacement of the nip roller 3, namely, the relative position of the nip roller 3 and the cooling roller 4 is regulated by inserting a tapered block, or a method wherein the force of pushing the nip roller 3 is regulated by an air cylinder or the like. However, in the case of forming a thin film with the thickness of the molten resin 2 at the nip point of up to 100 µm or the case where rubber hardness of the elastomer covering the nip roller 3 is 90 Hs JIS A or higher, the regulation by the amount of displacement may result in an excessively large pressure inconsistency, and the method of regulating the pressing force is preferable. While any adequate pressure of the pressing can be used, the pressure is preferably in the range of approximately 0.1 to 5 kN/m. When the pressure of pressing is within such range, the transfer of the surface of the nip roller 3 to the molten resin 2 will be facilitated with the effect of crushing the fish eyes, and the elastomer on the surface of the nip roller 3 will have an elongated life with reduced deflection of the nip roller 3, and as a consequence, sandwiching pressure will be consistent in the width direction.

The molten resin 2 is a single layer or a multi-layer polyolefin resin, and at least the layer on the side in contact with the nip roller 3 comprises a low density polyethylene, a linear low density polyethylene, or an ethylene-methyl methacrylate copolymer (EMMA). The transfer of the surface irregularity morphology of the rear surface of the surface protection film 6 to the adherend can be prevented by using a soft low density polyethylene, linear low density polyethylene, or ethylene-methyl methacrylate copolymer (EMMA) for the layer on the side in contact with the nip roller 3. The "polyolefin resin" is at least one polyolefin resin selected from polyethylene resin, polypropylene resin, ethylene copolymer such as ethylene-vinyl acetate copolymer, and ethylene-methyl methacrylate copolymer, and the like, and exemplary polyethylene resins include low density polyethylene, medium density polyethylene, high density polyethylene, and linear low density polyethylene. In this embodiment, the preferred is use of a low density polyethylene or a linear low density polyethylene, and the most preferred is use of a low density polyethylene having a density of 0.91 to 0.935 g/cm$^3$ or a linear low density polyethylene having a density of 0.87 to 0.935 g/cm$^3$. (The term "linear low density polyethylene" also includes the so-called linear ultra-low density polyethylene having a density of 0.87 to 0.92 g/cm$^3$.)

When such resin is used, sufficient pressure-sensitive adhesive force can be realized without adding an additive such as a tackifier when the arithmetic mean roughness Ra is up to 0.4 µm, and a surface protection film 6 having good quality and cost performance is thereby obtained. Generally, in the case of an optical film having a smooth surface such as phase difference film, the pressure-sensitive adhesive force is preferably 0.02 to 0.3 N/50 mm, and more preferably 0.04 to 0.2 N/50 mm. When the pressure-sensitive adhesive force is within such range, the peeling of the surface protection film 6 in the production step of the adherend by the insufficient pressure-sensitive adhesive force as well as the damages done to the adherend in the peeling of the surface protection film 6 from the adherend can be more readily prevented. For this purpose, stable pressure-sensitive adhesive force may be more readily attained by using a linear low density polyethylene resin and controlling the arithmetic mean roughness Ra of the adhesive surface to the range of up to 0.2 μm. In addition, the volume of the particles having a particle diameter in excess of 19 μm in the solid particles in the elastomer on the surface of the nip roller 3 is preferably up to 1%. As described above, when the volume of the particles having a particle diameter in excess of 19 μm in solid particles of the elastomer is up to 1%, the protrusions having a size of at least 0.05 mm$^2$ and a height of at least 5 μm are less likely to be formed on the rear surface of the surface protection film 4, and the number of the protrusions having a size smaller than such size will also be reduced. When the protrusions are formed on the rear surface, dents are simultaneously formed on the opposite adhesive side, and therefore, decrease in the number of protrusions on the rear surface results in the decrease of the number of dents in the adhesive side, and formation of the adhesive surface having an arithmetic mean roughness Ra of up to 0.2 μm is thereby facilitated.

The surface protection film 6 may have a multi-layer structure or a single-layer structure. For example, when the surface protection film 6 has a three-layer structure and a recycled material is used for the intermediate layer, cost of the starting material can be reduced. In the case of a single-layer structure, installation and maintenance costs can be reduced due to the simple production system. In addition, use of the same resin for all constituent layers is preferable in both single-layer and the multi-layer structures for easy reuse of the materials. However, in view of preventing dent formation by the transfer of the fish eyes to the adherend, use of a non-reuse resin is preferable since reuse of the resin is likely to result in the larger number of fish eyes.

The compressive modulus in thickness direction of the surface protection film 6 is preferably 20 to 70 MPa, and more preferably 25 to 50 MPa. While the fish eyes and foreign matters are either crushed or embedded in the film by pressing the film between the cooling roller 4 and the nip roller 3, the embedding and crushing may not be sufficient when the size of the fish eye or the foreign matter is large in relation to the film thickness or when the foreign matter is hard. Even in such case, the fish eyes and foreign matters are less likely to be transferred to the adherend by the cushioning property in the thickness direction when the compressive modulus in the thickness direction is up to 70 MPa. When the compressive modulus in the thickness direction is at least 20 MPa, crushing of the surface irregularities on the rear surface of the surface protection film 6 by the interlayer pressure in the winding is likely to be suppressed, and the releasability is less likely to be impaired, and good roll shape can be easily realized without large limitation in the winding conditions such as winding tension. When the molten resin 2 is a single type structure of a low density polyethylene or a linear low density polyethylene, a surface protection film having the compressive modulus as described above can be readily obtained.

Figure 2:
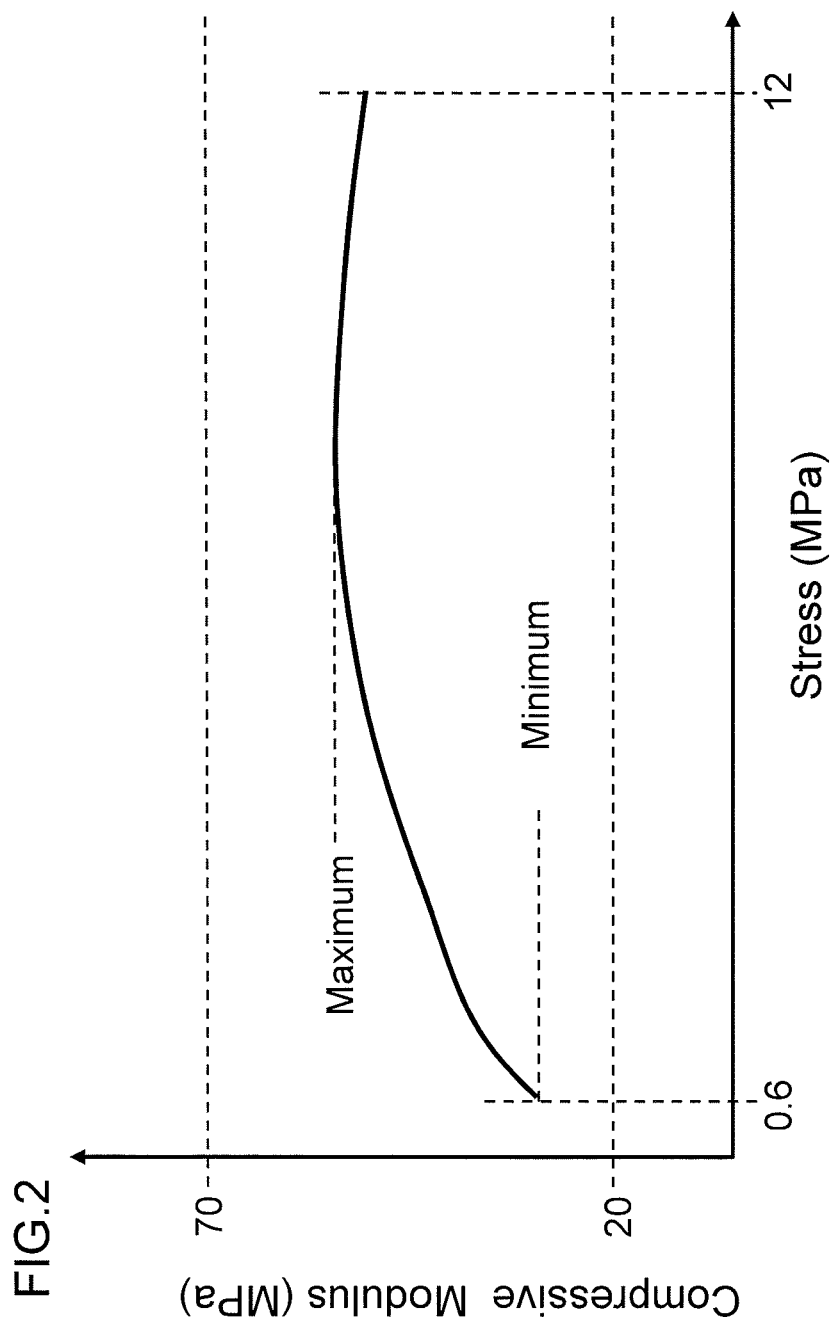
FIG. 2 shows an exemplary result in the measurement of compressive modulus in the thickness direction of the surface protection film of an embodiment of the present invention.

The compressive modulus may be measured, for example, by laminating the extruded film to a thickness of 2 mm, and giving compressive strain at a strain speed of 0.5 mm/second by using an Autograph to measure the pressure in relation to the strain and calculate the modulus. As shown in FIG. 2, the modulus of the plastic film is typically not a constant value in relation to the pressure, and therefore, the range between the maximum value and the minimum value of the modulus in the pressure range of 0.6 to 12 MPa is regarded the range of the compressive modulus.

EXAMPLES

Next, embodiments of the present invention are described in detail based on the Examples, which by no means limit the scope of the present invention. The method for measuring various physical property values and the method used for the evaluation are as described below.
(1) Surface Roughness The surface roughness of the cooling roller and the nip roller was measured with a portable surface roughness tester manufactured by Mitutoyo (SURFTEST SJ-301) by using a diamond needle having a stylus tip radius of 2.0 μm and a conical taper angle of 60° at a measuring force of 0.75 mN according to JIS B0601-1994. The arithmetic mean roughness (Ra), the ten point mean roughness (Rz), and the mean spacing between the surface irregularities (Sm) were measured at an evaluation length in the roll axial direction of 4 mm, a standard length of 0.8 mm, and a cut off of 0.8 mm.

The surface roughness of the surface protection film was measured with a fully automatic microfigure measuring instrument manufactured by Kosaka Laboratory Ltd. (SURFCORDER ET4000A) according to JIS B0601-1994. The arithmetic mean roughness (Ra), the ten point mean roughness (Rz), and the mean spacing between the surface irregularities (Sm) were respectively determined at an evaluation length in transverse direction of the film (TD of the film) of 2 mm at a pitch of 10 μm in machine direction (MD of the film) for 20 times, and conducting three dimensional analysis (at the unit of μm). It is to be noted that the measurement was conducted by using a diamond needle having a stylus tip radius of 2.0 μm and a conical taper angle of 60° at a measuring force of 10 mN and a cut off of 0.8 mm.
(2) Adhesion of the Surface Protection Film The specimens of Examples and Comparative Examples stored and adjusted under the conditions at a temperature of 23° C. and a relative humidity of 50% for 24 hours were adhered on a phase difference film (adherend) having a thickness of 50 μm comprising a cyclic olefin by using a roll press (Special press roller manufactured by Yasuda Seiki Seisakusho, Ltd.) at an adhesion pressure of 9,100 N/m and an adhesion speed of 300 cm/minute. The samples were stored under the conditions at a temperature of 23° C. and a relative humidity of 50% for 24 hours before the use for the measurement and evaluation.
(3) Pressure-sensitive Adhesion Force The pressure-sensitive adhesion force was measured by using a tensile tester ("Tensilon" versatile tester manufactured by Orientec) at a tensile speed of 300 mm/minute, and a peel angle of 180°.
(4) Transfer of the Fish Eyes to the Adherend (Dent Formation in the Adherend)

The fish eye defects of the surface protection film were preliminarily compared with dirt comparison chart prepared by National Printing Bureau to select fish eye defects with the size of 0.05 mm$^2$ to 0.1 mm$^2$, and the surface protection film of the part including such fish eyes was adhered to the adherend. The surface protection film and the adherend were sandwiched between smooth polycarbonate plates (plate thickness, 2 mm), and a load of 1.3 kg/cm$^2$ was applied. After storing in a hot air oven at 60° C. for 3 days and allowing to cool down to room temperature, the sample film was peeled off the adherend for examination wherein the adherend was examined for the presence of dents formed by the fish eyes.

○: no dent formed by fish eyes is found,
Δ: slight formation of the dents by the fish eyes, and
×: clear formation of the dents by the fish eyes.

(5) Roll Shape

The surface protection film 12 hours after winding in the form of a roll was visually inspected to confirm the presence of creases. The film with no crease formation was evaluated ○, the film with slight crease formation was evaluated Δ, and the film with considerable crease formation was evaluated ×.

(6) Blocking

From the surface protection film which has been wound in roll form, 50 m was manually rolled out, and visual observation was conducted while rolling out another 5 m. The one with no observation of the adhesion of the adhesive surface with the rear surface was evaluated ○, and the one with such observation was evaluated ×.

(7) Transfer of the Surface Irregularities on the Rear Surface to the Adherend 5 surface protection films and 5 adherends were alternately laminated and adhered, and the laminate was sandwiched between smooth polycarbonate plates (plate thickness, 2 mm), and a load of 1.3 kg/cm² was applied. After storing in a hot air oven at 60° C. for 3 days and allowing to cool down to room temperature, the sample film was peeled off the adherend for visual examination wherein the adherend was examined for the presence of dents formed by the surface irregularities on the rear surface.

○: no dent formed by the surface irregularities on the rear surface is found,
Δ: slight formation of the dents by the surface irregularities on the rear surface, and
×: clear formation of the dents by the by the surface irregularities on the rear surface.

(8) Number of Protrusions on the Rear Surface

The surface protection film was cut at 1 m², and the protrusions on the rear surface were compared with dirt comparison chart prepared by National Printing Bureau to select protrusions with the size of at least 0.05 mm², and the selected protrusions were measured for their size and height with a Ultra-high depth color 3D shape measurement microscope (VK-9500 manufactured by Keyence Corporation) to count the protrusions having a size of at least 0.05 mm² and a height of at least 5 μm. The discrimination between the fish eye and the protrusion was conducted by cutting the part of the fish eye (protrusion) and confirming the presence of the foreign matter or the oxide which is the nucleus of the fish eye.

(9) Streaks After the Polishing

The surface of the nip roller was irradiated with light at an angle of 5 to 20° in relation to the axis of the roller in a dark room, streaks made by the polishing was visually continued. The samples with clear streaks made by the polishing was evaluated ×, the samples with slight streaks were evaluated Δ, and the samples with no streaks were evaluated ○.

(10) Compressive Modulus

The surface protection film was laminated so that the thickness of the laminate was 2 mm, and the laminate was compressed with Autograph (AGS-100) manufactured by Shimadzu Corporation at a strain speed of 0.5 mm/second, and the pressure was measured. A stress-strain curve was depicted by using the pressure and the strain measured, and the maximum value and the minimum value of the modulus of longitudinal elasticity was determined in the pressure range of pressure of 0.6 MPa to 12 MPa.

(11) Maximum Surface Temperature of the Nip Roller

The temperature of the nip roller during the film formation was measured by using a radiation thermometer (IT2-100) manufactured by Keyence Corporation. The film formation speed was gradually increased, and the temperature immediately before the adhesion and winding of the molten resin onto the nip roller was used for the maximum temperature of the nip roller.

Example 1

By using the apparatus for fabricating the plastic film shown in FIG. 1, a linear low density polyethylene (LLDPE) having a density of 0.91 g/cm³ was extruded from a multimanifold type T die having the slit width adjusted to 0.9 mm in single type dual layer constitution, and the extruded film was pressed and cooled between a cooling roller and a nip roller to form a surface protection film having a thickness of 30 μm. The film was wound up by a winder to prepare a film roll. The surface of the cooling roller was coated with a chromium plating for engineering purpose at an arithmetic mean roughness Ra of 0.1 μm. The surface of the nip roller was covered with an RTV silicone rubber at a ten point mean roughness Rz of 3.4 μm and a mean spacing between the surface irregularities Sm of 44 μm. With regard to the surface roughness of the resulting surface protection film, the adhesive surface had an arithmetic mean roughness Ra of 0.11 μm, and the rear surface roughness had a ten point mean roughness Rz of 4.5 μm, a mean spacing between the surface irregularities Sm of 37 μm, and a compressive modulus in the film thickness direction of 31 to 44 MPa.

Example 2

A surface protection film was formed by using the apparatus and the method the same as those of Example 1 except that the nip roller surface had a ten point mean roughness Rz of 6.4 μm and a mean spacing between the surface irregularities Sm of 67 μm to produce a film roll. The adhesive surface of the resulting surface protection film had an arithmetic mean roughness Ra of 0.12 μm, and the rear surface of the resulting surface protection film had a ten point mean roughness Rz of 7.7 μm, a mean spacing between the surface irregularities Sm of 49 μm, and a compressive modulus in the film thickness direction of 28 to 55 MPa.

Example 3

A surface protection film was formed by using the apparatus and the method the same as those of Example 2 except that a high pressure low density polyethylene (LDPE) having a density of 0.92 g/cm³ was extruded in single type dual layer constitution to produce a film roll. The adhesive surface of the resulting surface protection film had an arithmetic mean roughness Ra of 0.28 μm, and the rear surface of the resulting surface protection film had a ten point mean roughness Rz of 7.9 μm, a mean spacing between the surface irregularities Sm of 49 μm, and a compressive modulus in the film thickness direction of 32 to 63 MPa.

Example 4

A surface protection film was formed by using the apparatus and the method the same as those of Example 1 except that the nip roller was covered with a HTV silicone rubber, the ten point mean roughness Rz was 7.2 µm, and the mean spacing between the surface irregularities Sm was 70 µm to produce a film roll. The adhesive surface of the resulting surface protection film had an arithmetic mean roughness Ra of 0.12 µm, and the rear surface of the resulting surface protection film had a ten point mean roughness Rz of 9.2 µm, a mean spacing between the surface irregularities Sm of 63 µm, and a compressive modulus in the film thickness direction of 26 to 44 MPa.

Example 5

A surface protection film was formed by using the apparatus and the method the same as those of Example 1 except that the resin had a dual type dual layer constitution, and the resin used for the layer on the side of the adhesive surface was linear low density polyethylene and the resin used for the layer on the rear side was ethylene-methyl methacrylate copolymer (EMMA) to thereby produce a film roll. The adhesive surface of the resulting surface protection film had an arithmetic mean roughness Ra of 0.17 µm, and the rear surface of the resulting surface protection film had a ten point mean roughness Rz of 5.0 µm, a mean spacing between the surface irregularities Sm of 39 µm, and a compressive modulus in the film thickness direction of 40 to 79 MPa.

Example 6

The surface of the nip roller was covered with an RTV silicone rubber having aluminum oxide powder mixed therewith so that the particles having the particle diameter in excess of 19 µm were about 3% of the solid particles in the filler, and final polishing was conducted by using a sandpaper having a grit size of P600. The nip roller had a ten point mean roughness Rz of 4.0 µm and a mean spacing between the surface irregularities Sm of 55 µm. A surface protection film was formed by using the apparatus and the method the same as those of Example 1 except for these to thereby produce a film roll. The adhesive surface of the resulting surface protection film had an arithmetic mean roughness Ra of 0.12 µm, and the rear surface of the resulting surface protection film had a ten point mean roughness Rz of 4.4 µm, a mean spacing between the surface irregularities Sm of 53 µm, and a compressive modulus in the film thickness direction of 32 to 46 MPa.

Example 7

The surface of the nip roller was covered with an RTV silicone rubber having aluminum oxide powder mixed therewith so that maximum particle diameter of the filler was 19 µm, namely, so that the particles having the particle diameter in excess of 19 µm were about 0% of the solid particles in the filler, and final polishing was conducted by using a rotating grinding wheel having a grit size of #800. The nip roller had a ten point mean roughness Rz of 3.6 µm and a mean spacing between the surface irregularities Sm of 51 µm. A surface protection film was formed by using the apparatus and the method the same as those of Example 1 except for these to thereby produce a film roll. The adhesive surface of the resulting surface protection film had an arithmetic mean roughness Ra of 0.11 µm, and the rear surface of the resulting surface protection film had a ten point mean roughness Rz of 3.9 µm, a mean spacing between the surface irregularities Sm of 51 µm, and a compressive modulus in the film thickness direction of 32 to 45 MPa.

Example 8

A surface protection film was formed by using the apparatus and the method the same as those of Example 1 except that the nip roller was covered with a RTV silicone rubber having aluminum oxide powder blended so that the maximum particle diameter of the filler was 11 µm, and the final polishing was conducted by using a rotating grinding wheel having a grit size of #800, and the nip roller surface had a ten point mean roughness Rz of 3.2 and a mean spacing between the surface irregularities Sm of 50 µm to produce a film roll. The adhesive surface of the resulting surface protection film had an arithmetic mean roughness Ra of 0.14 µm, and the rear surface of the resulting surface protection film had a ten point mean roughness Rz of 3.4 µm, a mean spacing between the surface irregularities Sm of 49 µm, and a compressive modulus in the film thickness direction of 33 to 45 MPa.

Comparative Example 1

A surface protection film was formed by using the apparatus and the method the same as those of Example 1 except that the arithmetic mean roughness Ra of the cooling roller was 0.3 µm to produce a film roll. The adhesive surface of the resulting surface protection film had an arithmetic mean roughness Ra of 0.42 µm, and the rear surface of the resulting surface protection film had a ten point mean roughness Rz of 5.7 µm, a mean spacing between the surface irregularities Sm of 38 µm, and a compressive modulus in the film thickness direction of 32 to 50 MPa.

Comparative Example 2

A surface protection film was formed by using the apparatus and the method the same as those of Example 1 except that the nip roller had a point mean roughness Rz of 1.6 µm and a mean spacing between the surface irregularities Sm of 35 µm to produce a film roll. The adhesive surface of the resulting surface protection film had an arithmetic mean roughness Ra of 0.11 µm, and the rear surface of the resulting surface protection film had a ten point mean roughness Rz of 2.6 µm, a mean spacing between the surface irregularities Sm of 31 µm, and a compressive modulus in the film thickness direction of 31 to 50 MPa.

Comparative Example 3

A surface protection film was formed by using the apparatus and the method the same as those of Example 1 except that the nip roller had a point mean roughness Rz of 9.5 µm and a mean spacing between the surface irregularities Sm of 72 µm to produce a film roll. The adhesive surface of the resulting surface protection film had an arithmetic mean roughness Ra of 0.28 µm, and the rear surface of the resulting surface protection film had a ten point mean roughness Rz of 11.5 µm, a mean spacing between the surface irregularities Sm of 66 µm, and a compressive modulus in the film thickness direction of 24 to 48 MPa.

Comparative Example 4

A surface protection film was formed by using the apparatus and the method the same as those of Example 1 except that the nip roller had a point mean roughness Rz of 6.8 µm and a mean spacing between the surface irregularities Sm of 93 µm to produce a film roll. The adhesive surface of the resulting surface protection film had an arithmetic mean roughness Ra of 0.14 μm, and the rear surface of the resulting surface protection film had a ten point mean roughness Rz of 6.7 μm, a mean spacing between the surface irregularities Sm of 91 μm, and a compressive modulus in the film thickness direction of 34 to 68 MPa.

Comparative Example 5

A surface protection film was formed by using the apparatus and the method the same as those of Example 1 except that the nip roller had a point mean roughness Rz of 7.0 μm and a mean spacing between the surface irregularities Sm of 154 μm to produce a film roll. The adhesive surface of the resulting surface protection film had an arithmetic mean roughness Ra of 0.15 μm, and the rear surface of the resulting surface protection film had a ten point mean roughness Rz of 5.0 μm, a mean spacing between the surface irregularities Sm of 199 μm, and a compressive modulus in the film thickness direction of 34 to 73 MPa.

Comparative Example 6

A surface protection film was formed by using the apparatus and the method the same as those of Example 1 except that the resin had a dual type dual layer constitution, and the resin used for the layer on the side of the adhesive surface was linear low density polyethylene and the resin used for the layer on the rear side was polypropylene homopolymer (PP). The adhesive surface of the resulting surface protection film had an arithmetic mean roughness Ra of 0.14 μm, and the rear surface of the resulting surface protection film had a ten point mean roughness Rz of 5.3 μm, a mean spacing between the surface irregularities Sm of 39 μm, and a compressive modulus in the film thickness direction of 38 to 60 MPa.

The results of the evaluation of the Examples and Comparative Examples are shown in Tables 1 and 2.

TABLE 1

| | | | Example 1 | Example 2 | Example 3 | Example 4 | Example 5 | Example 6 | Example 7 |
|---|---|---|---|---|---|---|---|---|---|
| Surface roughness of the cooling roll | Ra | μm | 0.1 | 0.1 | 0.1 | 0.1 | 0.1 | 0.1 | 0.1 |
| Surface roughness of the nip roll | Rz | μm | 3.4 | 6.4 | 6.4 | 7.2 | 3.4 | 3.2 | 3.0 |
| | Sm | μm | 44 | 67 | 67 | 70 | 44 | 43 | 48 |
| Elastomer of the nip roll | | | RTV | | | HTV | | RTV | |
| Resin | | | LLDPE | | LDPE | LLDPE | EMMA/LLDPE | LLDPE | |
| Surface roughness of the adhesive surface of the film | Ra | μm | 0.11 | 0.12 | 0.28 | 0.12 | 0.17 | 0.12 | 0.11 |
| Surface roughness of the rear surface of the film | Rz | μm | 4.5 | 7.7 | 7.9 | 9.2 | 5 | 4.4 | 4.1 |
| | Sm | | 37 | 49 | 49 | 63 | 39 | 41 | 44 |
| Compressive modulus in the thickness direction | Ep | MPa | 31–44 | 28–55 | 32–63 | 28–44 | 40–79 | 32–46 | 33–44 |
| Pressure-sensitive adhesion force | | N/50 mm | 0.04 | 0.04 | 0.03 | 0.04 | 0.04 | 0.04 | 0.04 |
| Transfer of the surface irregularities of the rear surface | | | ○ | ○ | ○ | ○ | ○ | ○ | ○ |
| Fish eye transfer | | | ○ | ○ | ○ | ○ | ○ | ○ | ○ |
| Blocking | | | ○ | ○ | ○ | ○ | ○ | ○ | ○ |
| Roll shape | | | ○ | ○ | ○ | ○ | ○ | ○ | ○ |
| Maximum surface temperature of the nip roll | | °C. | 140° C. or higher | 140° C. or higher | 140° C. or higher | 80° C. or lower | 140° C. or higher | 140° C. or higher | 140° C. or higher |
| Number of protrusions | | | 2 | 3 | 5 | 2 | 1 | 1 | 0 |
| Streaks | | | Δ | Δ | Δ | Δ | Δ | Δ | ○ |

TABLE 2

| | | | Comparative Example 1 | Comparative Example 2 | Comparative Example 3 | Comparative Example 4 | Comparative Example 5 | Comparative Example 6 |
|---|---|---|---|---|---|---|---|---|
| Surface roughness of the cooling roll | Ra | μm | 0.3 | 0.1 | 0.1 | 0.1 | 0.1 | 0.1 |
| Surface roughness of the nip roll | Rz | μm | 3.4 | 1.6 | 9.5 | 6.8 | 7.0 | 3.4 |
| | Sm | μm | 44 | 35 | 72 | 93 | 154 | 44 |
| Elastomer of the nip roll | | | RTV | | | | | |
| Resin | | | LLDPE | | | | | LLDPE/PP |
| Surface roughness of the adhesive surface of the film | Ra | μm | 0.42 | 0.11 | 0.28 | 0.14 | 0.15 | 0.14 |
| Surface roughness of the rear surface of the film | Rz | μm | 5.7 | 2.6 | 11.5 | 6.7 | 5 | 5.3 |
| | Sm | | 38 | 31 | 66 | 91 | 199 | 39 |
| Compressive modulus in the thickness direction | Ep | MPa | 32–50 | 31–50 | 24–48 | 34–68 | 34–73 | 38–60 |
| Pressure-sensitive adhesion force | | N/50 mm | No pressure-sensitive adhesion | 0.04 | 0.03 | 0.04 | 0.04 | 0.03 |
| Transfer of the surface irregularities of the rear surface | | | ○ | ○ | X | Δ | X | X |
| Fish eye transfer | | | ○ | Δ | ○ | Δ | X | Δ |
| Blocking | | | ○ | X | ○ | ○ | X | ○ |
| Roll shape | | | ○ | ○ | Δ | ○ | X | ○ |
| Maximum surface temperature of the nip roll | | °C. | 140° C. or higher | 140° C. or higher | 140° C. or higher | 140° C. or higher | 140° C. or higher | 141° C. or higher |
| Number of protrusions | | | 3 | 1 | 6 | 4 | 2 | 1 |
| Streaks | | | Δ | X | Δ | Δ | Δ | Δ |

In the surface protection films obtained in Examples 1 to 7, the arithmetic mean roughness Ra of the adhesive surface was 0.11 to 0.28 μm, and the pressure-sensitive adhesive force was 0.03 N/50 mm² or higher, namely, at the level conceivably sufficient in adhering to the adherend. The ten point mean roughness Rz of the rear surface was 3.4 to 9.2 μm, and the mean spacing between the surface irregularities Sm of the rear surface was 37 to 63 μm. The fish eyes and the surface irregularity morphology of the rear surface were not transferred to the adherend, and the roll shape was acceptable with no blocking or creases.

In the Examples 1 to 3 and 5 to 7 wherein the nip roller surface was covered with a RTV silicone rubber, adhesion of the molten resin to the nip roller surface was not confirmed even when the surface temperature of the nip roller reached 140° C. In the Example 4 wherein the nip roller surface was covered with a HTV silicone rubber, adhesion of the molten resin with the surface started when the nip roller surface temperature reached 80° C., and the film formation could not be continued due to the winding of the molten resin onto the nip roller. However, a stable film formation was possible when the film formation was conducted at a lower speed with the nip roller surface temperature reduced to 60° C.

In Example 5, different resins were used for the pressure-sensitive adhesive layer and the rear surface, and therefore, reuse the film is difficult. However, the film exhibited good results for all evaluation items.

In Examples 7 and 8, the solid particles having the particle diameter in excess of 19 μm was up to 1% of the solid particles in the filler in the elastomer, and accordingly, the number of the protrusions on the rear surface of the surface protection film having a size of at least 0.05 mm² and a height of at least 5 μm was zero. In addition, since final polishing of the nip roller surface was conducted by using a rotating grinding wheel, streaks remaining after the polishing were not confirmed. In the application wherein dent defects are extremely severely checked as in the case wherein a phase difference film for mobile terminal is the adherend, the surface protection film wherein the number of the protrusions having a size of at least 0.05 mm² and a height of at least 5 μm is 0 as in the cases of Examples 7 and 8 is particularly preferable, and surface protection film having no streaks remaining after the polishing is more preferable.

The film obtained in Comparative Example 1 had the arithmetic mean roughness Ra of the adhesive surface of 0.42 μm, and the pressure-sensitive adhesive force was not developed. In Comparative Example 2, the ten point mean roughness Rz of the rear surface was as small as 2.6 μm, and a slight transfer of the fish eye to the adherend was observed, and due to the insufficient releasability between the adhesive surface and the rear surface, blocking as well as crease formation occurred. In Comparative Example 3, the ten point mean roughness Rz of the rear surface was as high as 11.5 μm, and the transfer of the surface irregularity morphology of the rear surface to the adherend was confirmed. In Comparative Examples 4 and 5, the mean spacing between the surface irregularities of the rear surface was high, and the transfer of the surface irregularity morphology of the rear surface and the transfer of the fish eyes to the adherend were confirmed, and in Comparative Example 5, blocking as well as crease formation occurred with the resulting poor roll shape due to the insufficient releasability between the adhesive surface and the rear surface. In Comparative Example 6, the surface irregularity morphology was transferred to the adherend because of the hardness due to the use of PP to the rear surface layer.

The present invention can be used not only in the fabrication method and in the fabrication apparatus of the polyolefin surface protection film but also for the fabrication apparatus of the other plastic films, and the range of the application is not limited to such range.

EXPLANATION OF NUMERALS

1 T die
2 molten resin
3 nip roller
4 cooling roller
5 peeling roller
6 surface protection film
7 cutter
8 edge suction pipe
9 near roller
10 film roll
11 slit step
12 winding step
13 film edge
A film transfer direction

What is claimed is:

1. A surface protection film comprising one layer or two or more layers wherein one surface of the film, which is an adhesive surface of the film, has an arithmetic mean roughness Ra of up to 0.2 μm; and the layer forming the surface having the arithmetic mean roughness Ra of up to 0.2 μm comprises a low density polyethylene (LDPE) or a linear low density polyethylene (LLDPE);
   the other surface of the film, which is the rear surface of the film, has a ten point mean roughness Rz of 4.1 to 10 μm and a mean spacing between surface irregularities Sm of up to 90 μm; and the layer forming the surface having the ten point mean roughness Rz of 4.1 to 10 μm and the mean spacing between the surface irregularities Sm of up to 90 μm comprises a low density polyethylene (LDPE), a linear low density polyethylene (LLDPE), or an ethylene-methyl methacrylate copolymer (EMMA),
   wherein the surface protection film is formed by ejecting a molten resin from a T die, pressing and cooling the extrudate between a cooling roller and a nip roller, wherein the cooling roller has an arithmetic mean roughness Ra of up to 0.2 μm, and the nip roller has an elastomer surface with a ten point mean roughness Rz of 2 to 8 μm and a mean spacing between the surface irregularities Sm of up to 90 μm.

2. A surface protection film according to claim 1 wherein a number of protrusions on the other surface of the surface protection film having a size of at least 0.05 mm² and a height of at least 5 μm is 0 per m².

3. A surface protection film according to claim 1 comprising one layer or two or more layers wherein all layers comprise a low density polyethylene or a linear low density polyethylene.

4. A surface protection film according to claim 1 comprising one layer or two or more layers wherein all layers comprise a linear low density polyethylene, and the arithmetic mean roughness Ra of the one surface is up to 0.2 μm.

5. A surface protection film according to claim 1 wherein compressive modulus in the film thickness direction is 20 to 70 MPa.

* * * * *